(12) United States Patent
Chong

(10) Patent No.: US 9,148,312 B2
(45) Date of Patent: Sep. 29, 2015

(54) DIGITAL FEED FORWARD NOISE CANCELLING REGULATOR

(71) Applicant: Futurewei Technologies, Inc., Plano, TX (US)

(72) Inventor: Euhan Chong, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 13/802,519

(22) Filed: Mar. 13, 2013

(65) Prior Publication Data

US 2014/0269975 A1    Sep. 18, 2014

(51) Int. Cl.
*H04K 1/02* (2006.01)
*H04L 25/02* (2006.01)

(52) U.S. Cl.
CPC .................... *H04L 25/028* (2013.01)

(58) Field of Classification Search
CPC ................................... H04L 25/028
USPC ................................................ 375/297
See application file for complete search history.

(56) References Cited

U.S. PATENT DOCUMENTS

| 6,262,607 B1 * | 7/2001 | Suzuki | 327/112 |
|---|---|---|---|
| 7,817,727 B2 * | 10/2010 | Kumar et al. | 375/258 |
| 7,924,046 B1 | 4/2011 | Ding | |
| 8,446,173 B1 * | 5/2013 | Faucher et al. | 326/86 |
| 2003/0193351 A1 * | 10/2003 | Fukui | 326/83 |
| 2005/0068060 A1 | 3/2005 | Ooshita et al. | |
| 2007/0002954 A1 | 1/2007 | Cornelius et al. | |
| 2011/0133788 A1 * | 6/2011 | Liu et al. | 327/108 |

FOREIGN PATENT DOCUMENTS

WO    2010/014393 A1    2/2010

OTHER PUBLICATIONS

Foreign Communication From a Counterpart Application, PCT Application No. PCT/CN2014/073312, International Search Report dated Jun. 25, 2014, 3 pages.
Makon, R. E. et al. "107-112 Gbit/s fully Integrated CDR/1:2 DEMUX Using InP-Based DHBTs," Proceedings of the 5th European Microwave Integrated Circuits Conference, Paris, France, Sep. 27-28, 2010, pp. 206-209.
Mineyama, A. et al. "A 20 Gb/s 1:4 DEMUX with Near-Rail-to-Rail Logic Swing in 90 nm CMOS process," IEEE MTT-S International Microwave Workshop Series on Signal Integrity and High-Speed Interconnects (IMWS 2009-R9), Guadalajara, Mexico, Feb. 19-20, 2009, pp. 119-122.

(Continued)

*Primary Examiner* — Juan A Torres
(74) *Attorney, Agent, or Firm* — Conley Rose, P.C.; Grant Rodolph; William H. Dietrich

(57) ABSTRACT

An apparatus comprising a circuit configured to determine whether a data sequence comprises a pre-defined data pattern, regulate an output current based on the pre-defined data pattern, and feed the output current to a transmitter configured to transmit a bitstream comprising the data sequence. Also an apparatus for data transmission comprising a transmitter configured to transmit a bitstream comprising a number of consecutive identical digits (CIDs), and a driver coupled to the transmitter and configured to regulate an output current based on the CIDs to stabilize an output voltage, and feed the output current and output voltage to the transmitter.

20 Claims, 9 Drawing Sheets

(56) References Cited

OTHER PUBLICATIONS

Or, P.Y. et al. "A Fast-Transient Low-Dropout Regulator With Load-Tracking Impedance Adjustment and Loop-Gain Boosting Technique," IEEE Transactions on Circuits and Systems-II: Express Briefs, vol. 57, No. 10, Oct. 2010, pp. 757-761.

Tseng, C-Y et al. "An Integrated Linear Regulator With Fast Output Voltage Transition for Dual-Supply SRAMs in DVFS Systems," IEEE Journal of Solid-State Circuits, vol. 45, No. 11, Nov. 2010, pp. 2239-2249.

Hazucha, P. et al. "Area-Efficient Linear Regulator With Ultra-Fast Load Regulation," IEEE Journal of Solid-State Circuits, vol. 40, No. 4, Apr. 2005, pp. 933-940.

Jackum, T. et al. "Fast Transient Response Capacitor-Free Linear Voltage Regulator in 65nm CMOS," IEEE 2011, pp. 905-908.

Maity, A. et al. "On-chip Voltage Regulator with Improved Transient Response," Proceedings of the 18th International Conference on VLSI Design held jointly with 4th International Conference on Embedded Systems Design, IEEE 2005, 6 pgs.

\* cited by examiner

DIGITAL FEED FORWARD NOISE CANCELLING REGULATOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transmitters are commonly used today in data communication devices at the transmission end of a bitstream comprising digital data. A transmitter needs a driver to supply its voltage and/or current, and depending on implementation, there are various modes of driving circuits or drivers. In particular, voltage-mode drivers have found widespread use due to their low power consumption compared to current-mode drivers, such as current mode logic (CML) style drivers. Voltage-mode drivers may also scale well with process technology. However, voltage-mode drivers may be relatively sensitive to noise on the power supply, which may cause potential issues because voltage-mode transmitters may sometimes generate large current spikes that are dependent on a pattern of transmission data. The current spikes may cause voltage fluctuations on the supply, which may translate directly to jitter at the transmitter output. Consequently, high performance voltage-mode drivers may require high performance regulators in order to transmit data with minimal jitter. A high performance regulator may need to respond quickly to changes in current drawn from the transmitter, especially in high speed data communications, in order to minimize voltage fluctuations or noises on the supply.

SUMMARY

In one embodiment, the disclosure includes an apparatus comprising a circuit configured to determine whether a data sequence comprises a pre-defined data pattern, regulate an output current based on the pre-defined data pattern, and feed the output current to a transmitter configured to transmit a bitstream comprising the data sequence.

In another embodiment, the disclosure includes a method comprising determining whether a data sequence comprises a pre-defined data pattern, regulating an output current of a circuit based on the pre-defined data pattern, and transmitting a bitstream comprising the data sequence using the output current as a driving current.

In yet another embodiment, the disclosure includes an apparatus for data transmission comprising a transmitter configured to transmit a bitstream comprising a number of consecutive identical digits (CIDs), and a driver coupled to the transmitter and configured to regulate an output current based on the CIDs to stabilize an output voltage, and feed the output current and output voltage to the transmitter.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
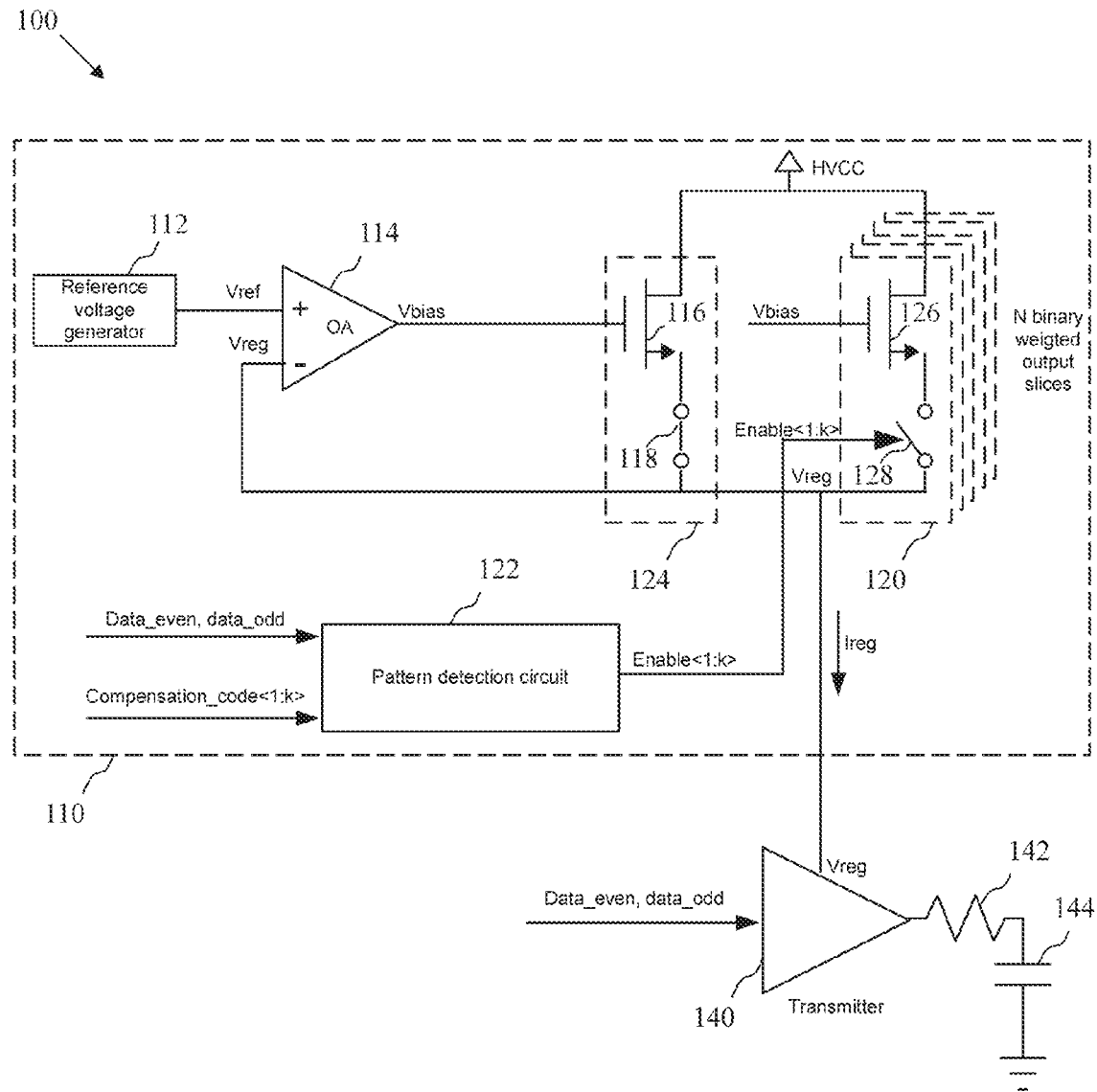
FIG. 1 illustrates an embodiment of part of a transmission device.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There are a few approaches to reduce voltage noise from a driver, although each approach may have its own drawbacks. For example, a first conventional approach is to use a high bandwidth amplifier in conjunction with a potentially large capacitor at a regulated node. The high bandwidth amplifier may be needed to maintain low impedance, which may depend on the large output capacitor. This approach may result in high power consumption by the amplifier in order to achieve high bandwidth. Further, the large capacitor may lead to large area overhead.

A second approach may use dual feedback loops in a regulator. Specifically, one loop may function as a high gain slow path, while the other loop may function as a fast response path. A potential drawback of this approach is that the fast response path may be power hungry and may require additional large capacitors for compensation. Thus, the performance of dual loop feedback regulators may not be more effective than the first approach. In addition, the dual loop feedback regulators may often be implemented in P-channel metal oxide semiconductor field-effect transistors (P-MOSFETs, in short as PMOS) low drop-out regulators in order to extend the bandwidth of the loop.

A third approach may use a regulator with a circuit that draws additional current from the driver to maintain a more consistent current draw to the regulator. The regulator may then continually provide a maximum current drawn by the transmitter regardless of a data pattern of the transmit data (e.g., transition density). This regulator may reduce noise on the power supply of the transmitter but may cause a relatively significant power penalty. In addition, the area overhead of the current-drawing circuit may also be significant depending on how well replica circuits need to be matched.

Disclosed herein are apparatuses, circuits, and methods for improved regulation of driver current and/or voltage in a transmission device. In an embodiment of a disclosed driver, an output current feeding a transmitter may be regulated or adjusted adaptively based on a data pattern. The data pattern may be included in a data sequence to be processed and transmitted by the transmitter. Regulation of the output current may be achieved by switching in or switching out a number of output circuit branches or slices in the driver. For example, a digital data pattern detection circuit located in the driver may pre-process the data sequence to detect whether it comprises a pre-defined data pattern, such as a sequence of consecutive identical digits (CIDs) with a number of the CIDs no less than a pre-defined threshold. If the data pattern is detected, a number of ON output slices contributing to the output current may be altered. Regulating the output current may instantaneously change the drive strength of the driver to match a current drawn by the transmitter, which is pattern dependent. As a result, a regulated output voltage of the driver may be stabilized regardless of the data pattern processed by the transmitter, which may help reduce noise and jitter. The disclosed driver may produce a less-noisy power supply for the transmitter with very little power or area overhead compared to existing solutions.

FIG. 1 illustrates an embodiment of part of a transmission device 100, which may comprise a driver 110 and a transmitter 140 coupled to the driver 110. The driver 110 may comprise a reference voltage generator 112, a differential operational amplifier (OA) 114, an N-channel MOSFET (in short as NMOS) 116, a switch 118, a number of output slices 120, and a pattern detection circuit 122 arranged as shown in FIG. 1. The reference voltage generator 112 may produce a reference voltage, denoted as Vref, which feeds into the amplifier 114 as a positive input. An output voltage of the driver 110 may also feed into the amplifier 114 as a negative input. Since this output voltage is regulated by the disclosed circuitry, it may be denoted herein as Vreg. The amplifier 114 may generate a bias voltage, denoted as Vbias, based on a difference between its positive and negative inputs (i.e., Vref and Vreg). The bias voltage may be connected to the gate of the NMOS 116 and may control the on/off state of the NMOS 116 as well as the source current of the NMOS 116. A voltage supply coupled to the drain of the NMOS 116 is denoted as HVCC. The switch 118 coupled to the source of NMOS 116 may normally be closed and may be implemented as another transistor or any other type of switch. The switch 118 may sometimes be used for impedance matching purposes. A circuit branch comprising the NMOS 116 and the switch 118 may sometimes be referred to as an output branch or slice 124, as this basic structure contributes to an output current and may be replicated within the driver 110.

The driver 110 may produce the regulated output voltage (i.e., Vreg) and a regulated output current, denoted as Ireg, which act as power supply to the transmitter 140. In implementation, the amount of current drawn by the transmitter 140 may vary depending on a pattern of a data sequence being processed and transmitted by the transmitter 140. For example, when a certain number of CIDs (e.g., consecutive binary 1's or 0's) appear in the data sequence, the transmitter 140 may draw relatively less current from the driver 110; otherwise, when a transition (e.g., from 1 to 0, or 0 to 1) occurs, the transmitter 140 may draw relatively more current from the driver 110.

Some conventional drivers may not have any additional slice 120 or the pattern detection circuit 122. Depending on implementation, the switch 118 may or may not be present. A conventional driver may still be equipped with the NMOS 116 and the amplifier 114, which may act as its regulator. For example, when the current drawn by the transmitter 140 increases, the conventional driver may use its regulator to provide extra current to the transmitter 140. Specifically, Vreg may be lowered due to the increased drawn current, so that the amplifier 114 may generate a higher Vbias, which in turn may increase the source current flowing through the NMOS 116, due to its increased gate-source voltage. A potential issue is that although extra current may be supplied to the transmitter 140 by controlling the bias voltage, the output voltage may fluctuate with the data pattern, which may lead to jitters at the output of the transmitter 140. Additionally, in high speed data communications, the amplifier 114 may not respond fast enough to changing data patterns, which may also contribute to Vreg fluctuations.

Transmitter drivers disclosed herein may overcome the issue of voltage fluctuation in some conventional drivers. In an embodiment, one or more additional output slices 120 may be configured to supply extra output current to the transmitter 140 whenever needed, while keeping Vreg relatively stabilized regardless of the data pattern feeding into the transmitter 140. There may be N output slices 120, where N is an integer, and the N slices may be binary weighted, the details of which are described later. Each output slice 120 may comprise an NMOS transistor 126 and a switch 128. For clarity, only one slice 120 is shown in detail in FIG. 1, although it should be noted that other output slices 120 may have the same or similar structure. The NMOS 126 is a drive transistor, which may be a high voltage NMOS device working as a source follower. The switch 128 may be a low voltage PMOS device, or any other suitable type of switch. The switch 128 may be referred to as a series complimentary MOS (CMOS) switch. For each NMOS 126 in each output slice 120, its drain may be connected to HVCC, its gate may be connected to the bias voltage (i.e., Vbias), and its source may be connected to the switch 128. The opening and closing states of the switch 128 may be programmable. Opening the switch 128 may turn off (or switch out) the output slice 120, while closing the switch 128 may turn on (or switch in) the slice 120.

The output slices 120 and 124 may also be referred to as regulator slices, since they are configured to regulate an output current driving the transmitter 140. Since the switch 118 may normally be closed, for convenience its corresponding output slice 124 may sometimes be referred to as a fixed output slice. On the other hand, since the switches 128 are switchable, their corresponding slices 120 may sometimes be referred to as dynamic or programmable output slices. The dynamic slices 120 may act as a regular for the disclosed driver 110. For example, when a current drawn by the transmitter 140 increases, instead of decreasing Vreg to increase the output current (i.e., Ireg), at least some of the switches 128 may be closed, thereby turning on their corresponding output slices 120. Accordingly, extra current may be provided by the additional slices 120 without altering Vreg or Vbias. A relatively stable Vreg may be produced, which reduces output jitter of the transmitter 140.

The driver 110 may use a digital feed-forward path to control or regulate its output current. In an embodiment, some or all of the switches 128 are controlled by the pattern detection circuit 122, which may be configured to receive a data sequence (e.g., same data sequence feeding into the transmitter 140) or a deserialized version of the data sequence. The pattern detection circuit 122 may continuously analyze the data sequence to detect whether it comprises a pre-defined data pattern, such as a number of CIDs equaling or exceeding a pre-defined threshold. Depending on whether the pre-defined data pattern exists, the pattern detection circuit 122 may control some or all of the switches 128 to be open or closed. Note that the threshold for the number of CIDs may be any value greater than one and may depend on implementation.

Further, a default state of the switches 128 may be set as open or closed. Suppose, for example, the switches 128 are closed by default, leaving their corresponding slices 120 in an on state. When a certain number of CIDs appear in the data sequence, the transmitter 140 needs relatively less current from the driver 110. The pattern detection circuit 122 may detect the CIDs and generate a disabling signal to open the switches 128, thereby turning off the slices 120. Depending on how much current is still drawn by the transmitter 140, part of the switches 128 may remain closed. Multiple control signals, which may be enabling or disabling signals, may be used by the pattern detection circuit to control different switches. To reduce the number of required control signals, some of the switches 128 may be grouped to be controlled by one signal. For this purpose, the output of the pattern detection circuit 122 is sometimes denoted herein as Enable<1:k>, where k is an integer greater than one indicating a number of control signals. A pre-defined code, denoted as Compensation_code<1:k>, may also be fed into the pattern detection circuit 122 to indicate which portion of the switches 128 to control in terms of opening or closing. Otherwise, if the pattern detection circuit 122 does not detect the CIDs at any time, the switches 128 may simply remain closed.

Similarly, for another example, the switches 128 may be set to open by default, leaving their corresponding slices 120 in an off state. In this case, if the pattern detection circuit 122 does not detect the CIDs in a data sequence, the circuit 122 may generate an enabling signal to close at least one of the switches 128, thereby turning on the corresponding slices 120. Otherwise, the switches 128 may remain in the default state. Compared to a conventional driver, the disclosed driver 110 may cause little, if any, power and/or area overhead, since no large capacitor is needed.

In some applications, e.g., high speed data communications with full data rate greater than 500 Mega bits per second (Mbps), serializer/deserializer (SerDes) blocks may be implemented in a transmission device, in order to compensate for limited communication speed at interfaces or inputs/outputs. Examplary applications of high speed data communication include, but are not limited to, inter-chip communication, Peripheral Component Interconnect (PCI) Express communication, Serial AT Attachment (SATA), Universal Serial Bus (USB), 10 Gigabit Media Independent Interface (XGMII) communication, and so forth. In use, a full-rate (e.g., 12.8 Gbps) data sequence arriving at a transmission device may be decomposed by a deserializer into two half-rate data sequences, which are commonly referred to as an even data sequence (denoted as data_even) and an odd data sequence (denoted as data_odd). In an embodiment, the even and odd data sequences may be received and then analyzed by the pattern detection circuit 122, which may be referred to as a high speed digital data pattern detection circuit for high speed communications. If desired, the even and odd data sequences may be converted by a serializer back to a full-rate data sequence, e.g., at the output of the transmission device. Although the even and odd data sequences are used herein as an example, it should be understood that a full-rate data sequence may be decomposed into any number of sequences or streams without departing from principles of the present disclosure.

Using the output current and/or output voltage of the driver 110 as power supplies, the transmitter 140 may produce a bitstream comprising the digital data sequence, that is, the same data sequence used by the driver 110. The bitstream may go through a low-pass filter formed by a resistor 142 and a capacitor 144. The bitstream may eventually be transmitted from the transmission device 100 to a receiving device. Note that the transmitter 140 may be a simplified representation of a practical transmitter, thus other components may be incorporated accordingly depending on implementation. Further, one skilled in the art will recognize that the transmission device 100 (sometimes referred to directly as a transmitter) may comprise other components or modules to perform its functions.

Figure 2:
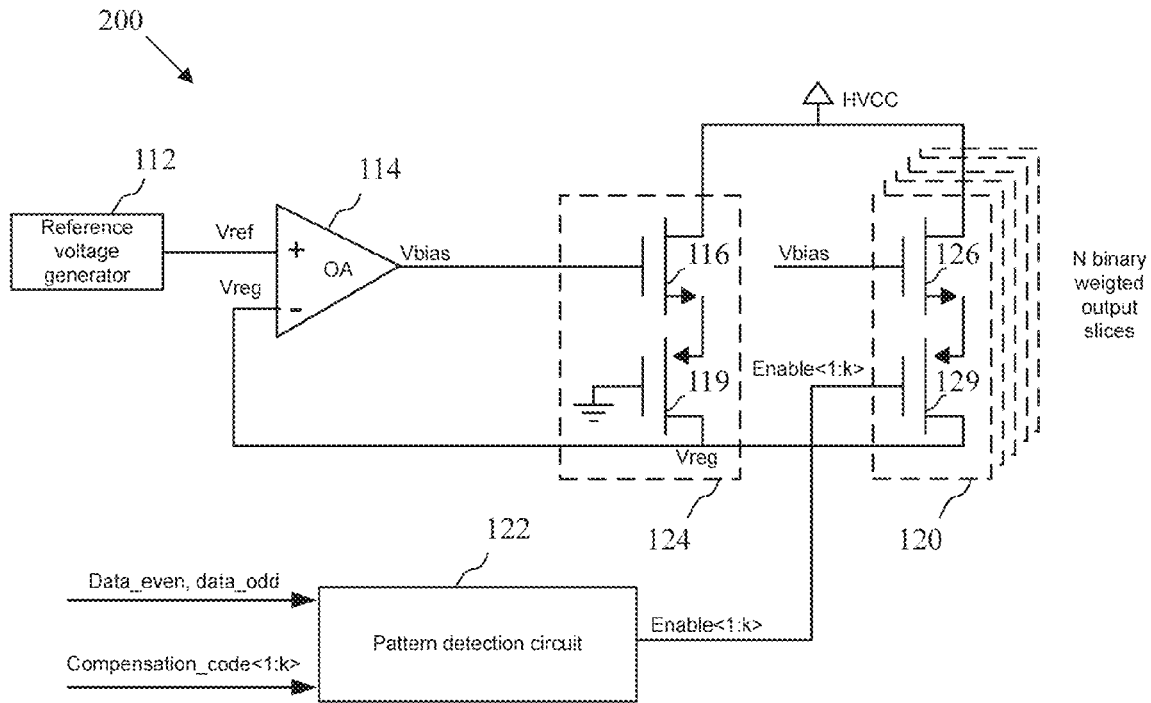
FIG. 2 illustrates an embodiment of a driver.

FIG. 2 illustrates an embodiment of a driver 200, which may be considered a specific implementation of the driver 110. As shown in FIG. 2, a PMOS transistor 119 is coupled to the NMOS 116, forming the fixed output slice, while a PMOS transistor 129 is coupled to the NMOS 126 in each of the dynamic output slices. Each pair of NMOS and PMOS transistors may construct a switching circuit and function as an output slice. Note that the transistors used in each output slice may not necessarily be different in type. If desired, two NMOS transistors or two PMOS transistors may also function as an output slice, as long as their corresponding voltages and the operational amplifier input polarities are properly configured.

Figure 3:
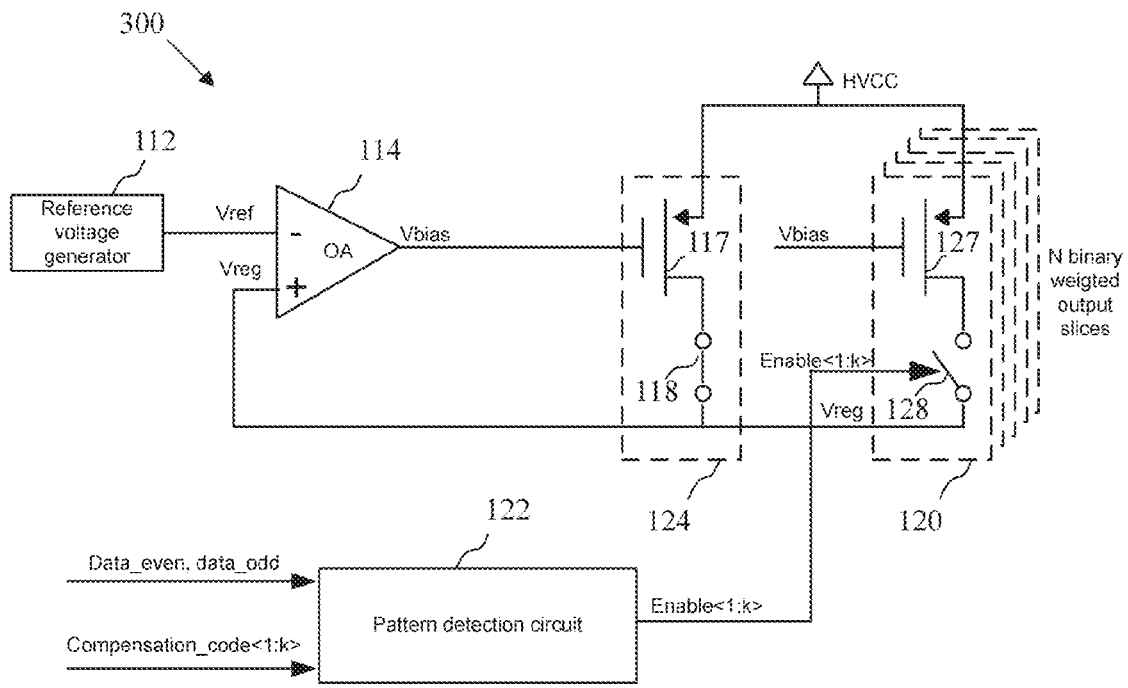
FIG. 3 illustrates an embodiment of another driver.

FIG. 3 illustrates an embodiment of a driver 300, which may be similar to the driver 110 except that the NMOS transistors 116 and 126 are replaced by PMOS transistors 117 and 127 respectively, and that input polarities of the amplifier 114 are reversed. Thus, one skilled in the art will recognize that any type of transistors (MOSFET, bipolar junction transistor (BJT), etc.) and/or any suitable configuration may be adopted within the scope of this disclosure.

Figure 4:
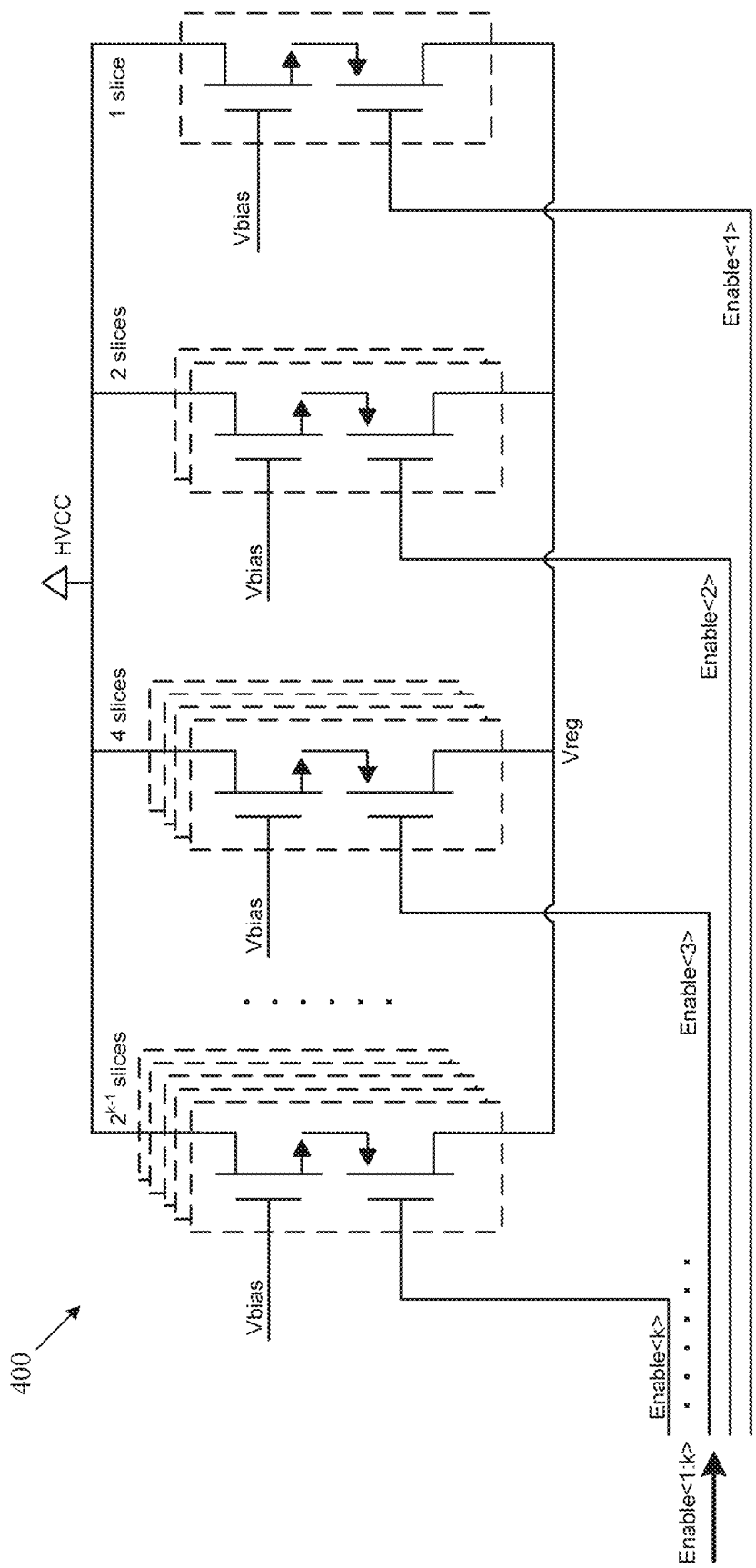
FIG. 4 illustrates an embodiment of a binary weighted configuration of dynamic output slices in a driver.

As mentioned previously, based on the amount of current drawn by a transmitter, some dynamic slices may be turned on and other dynamic slices may be turned off at the same time. Depending on the implementation, each dynamic output slice may be controlled individually by a signal, otherwise a group of dynamic output slices may be controlled together by a signal. FIG. 4 illustrates an embodiment of a binary weighted configuration 400 of dynamic output slices in a driver, such as the driver 200. As shown in FIG. 4, the output of a pattern detection circuit, denoted as Enable<1:k>, may comprise k control signals noted as Enable<1> to Enable<k>. Further, each of the k control signals generated by the pattern detection circuit may control a distinct number of slices, wherein k denotes a number of groups that the output slices have been divided to, and wherein each of the groups comprises at least one output slice. Since k may be expressed in a binary form (e.g., using m bits if $k=2^{m-1}$), the number of slices controlled by each of the k signal may depend on a binary value.

As shown in FIG. 4, one slice may be controlled by a first signal Enable<1>, two slices may be controlled by a second signal Enable<2>, four slices may be controlled by a third signal Enable<3>, . . . , and $2^{k-1}$ slices may be controlled by a k-th signal Enable<k>. Accordingly, only k signals are needed to control a total of $2^k-1$ dynamic slices. Compared with individually controlling the $2^k-1$ slices which requires $2^k-1$ signals, the binary weighted configuration 400 may simplify implementation while still offering flexibility in controlling the drawn current.

Figure 5A:
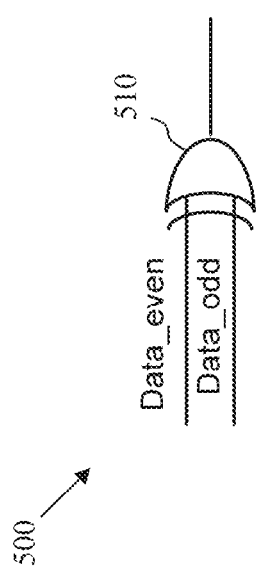
FIG. 5A illustrates an embodiment of a pattern detection logic.

In an embodiment, the pre-defined data pattern is a sequence of CIDs, wherein the number of the sequence of CIDs is no less than a pre-defined threshold. This threshold may have any suitable value (e.g., 2, 3, 4, etc.). FIG. 5A illustrates an embodiment of a pattern detection logic 500, which may be implemented in a pattern detection circuit (e.g., the pattern detection circuit 122). The pattern detection logic 500 is configured to generate a disabling signal when detecting two or more CIDs in a data sequence. As shown in FIG. 5A, the pattern detection logic 500 comprises a XOR logic gate 510, which receives even and odd data sequences generated from one full-rate data sequence.

Figure 5B:
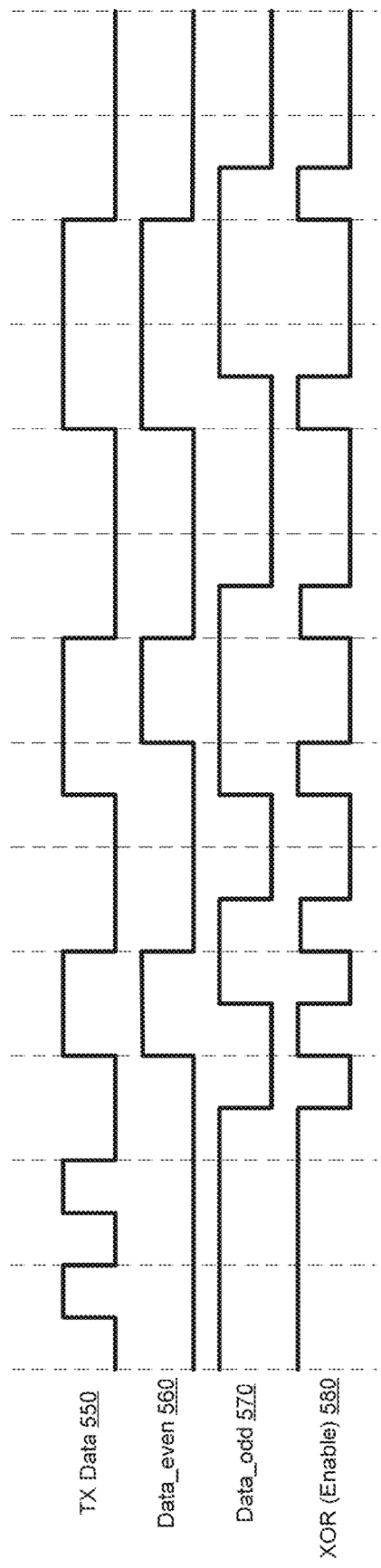
FIG. 5B illustrates a waveform simulation result.

FIG. 5B illustrates a waveform simulation result generating by applying the pattern detection logic 500 on an examplary data sequence 550, denoted as TX data. The data sequence 550 may be a full-rate stream being transmitted by a transmitter. As shown in FIG. 5B, the data sequence 550 comprises several sequences of two CIDs, three CIDs, and four CIDs. Note that the waveform represents binary 1 and 0 (although any other type of data may be used as well), and an interval between each two dashed vertical lines equals two periods of binary data. The data sequence 550 may be deserialized into a parallel even data sequence 560 and a parallel odd data sequence 570. The half-rate parallel data sequences (e.g., the data sequence 560 and 570) may be available from deserialization that occurs in a transmitter (e.g., the transmitter 140 in FIG. 1). If the half-rate parallel data sequences are not available, there are a number of methods in which deserialization may be performed. For example, a 2 flip-flop shift register may perform 1:2 deserialization, while a 4 flip-flop shift register may perform 1:4 deserialization. An output of the 2 bit shift register may then be sampled by a half-rate clock to convert the full rate serial data sequence to even and odd portions (e.g., the sequences 560 and 570) of the serial full-rate data sequence 550. In implementation, the even and odd data sequences 560 and 570 may exist within the transmitter, which may then convert the even and odd data sequences 560 and 570 back to the full-rate data sequence 550 by using a 2:1 mux at the output. One skilled in the art will understand how the deserialization is completed.

By performing a logic operation—exclusive or (XOR) on the data sequences 560 and 570, an output signal 580, denoted as XOR(Enable), may be generated. As shown in FIG. 5B, the output signal is an enabling signal when represented by 1 and a disabling signal when represented by 0. When two CIDs (1's or 0's) appear, the output signal may be a disabling signal for one period, which turns off at least part of the dynamic output slices (e.g., slices 120) for one period. When three CIDs appear, the output signal may be a disabling signal for two periods, which turns off at least part of the dynamic output slices for two periods. Thus, when P CIDs appear (P greater than one), the output signal may be a disabling signal for P−1 periods, which turns off at least part of the dynamic output slices for P−1 periods.

Figure 6A:
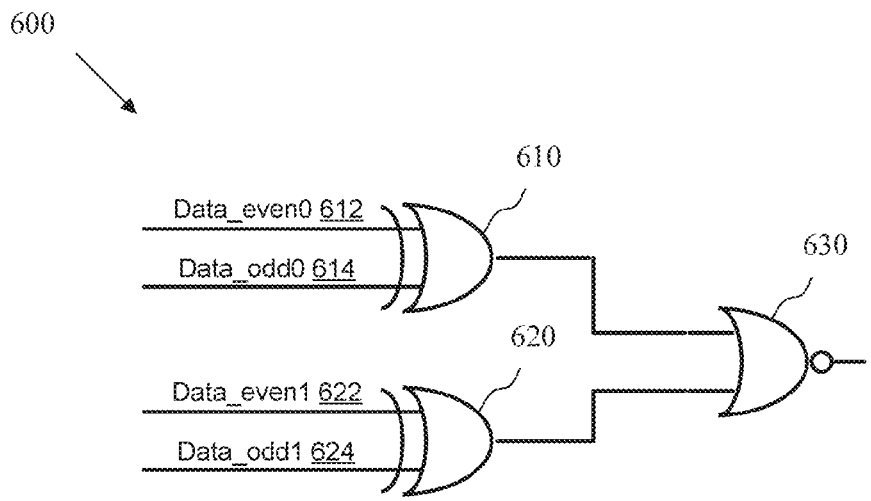
FIGS. 6A-6B illustrate other embodiments of a pattern detection logic.

FIG. 6A illustrates an embodiment of a pattern detection logic 600, which may be implemented in a pattern detection circuit (e.g., the pattern detection circuit 122). The pattern detection logic 600 is configured to generate a disabling signal when detecting three or more CIDs in a data sequence. As shown in FIG. 6A, the pattern detection logic 600 comprises two XOR logic gates 610 and 620 followed by a negated or (NOR) logic gate 630. The gate 610 receives even and odd data sequences, denoted as Data_even0 612 and Data_odd0 614 respectively, which are punctual half-rate streams generated from one full-rate data sequence. The gate 620 receives time-converted versions (e.g., delayed or advanced in time) of the Data_even0 612 and Data_odd0 614 streams, which are denoted as Data_even1 622 and Data_odd1 624. The output of the XOR gates 610 and 620 are processed by the NOR gate 630, thereby generating the output signal.

Figure 6B:
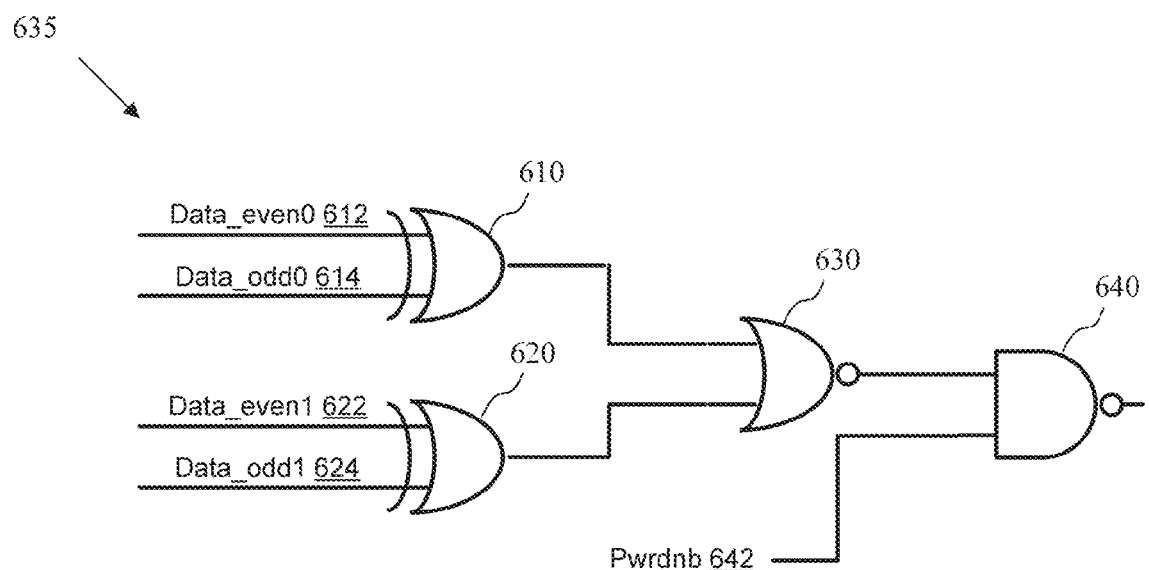

One skilled in the art will recognize that any other data pattern may be detected by appropriate design of the pattern detection circuit. In some embodiment, the pattern detection circuit may be controlled by additional input signal(s). For example, in a pattern detection logic 635 as shown in FIG. 6B, an additional negated and (NAND) logic gate 640 may be added after the NOR gate 630. The NAND gate 640 may receive the output of the NOR gate 630 and another input signal 642, which may be used to power down (thus input signal 642 denoted as pwrdnb) or disable the pattern detect circuit and keep all the output slices at their default state (e.g., with all slices turned on).

Figure 6C:
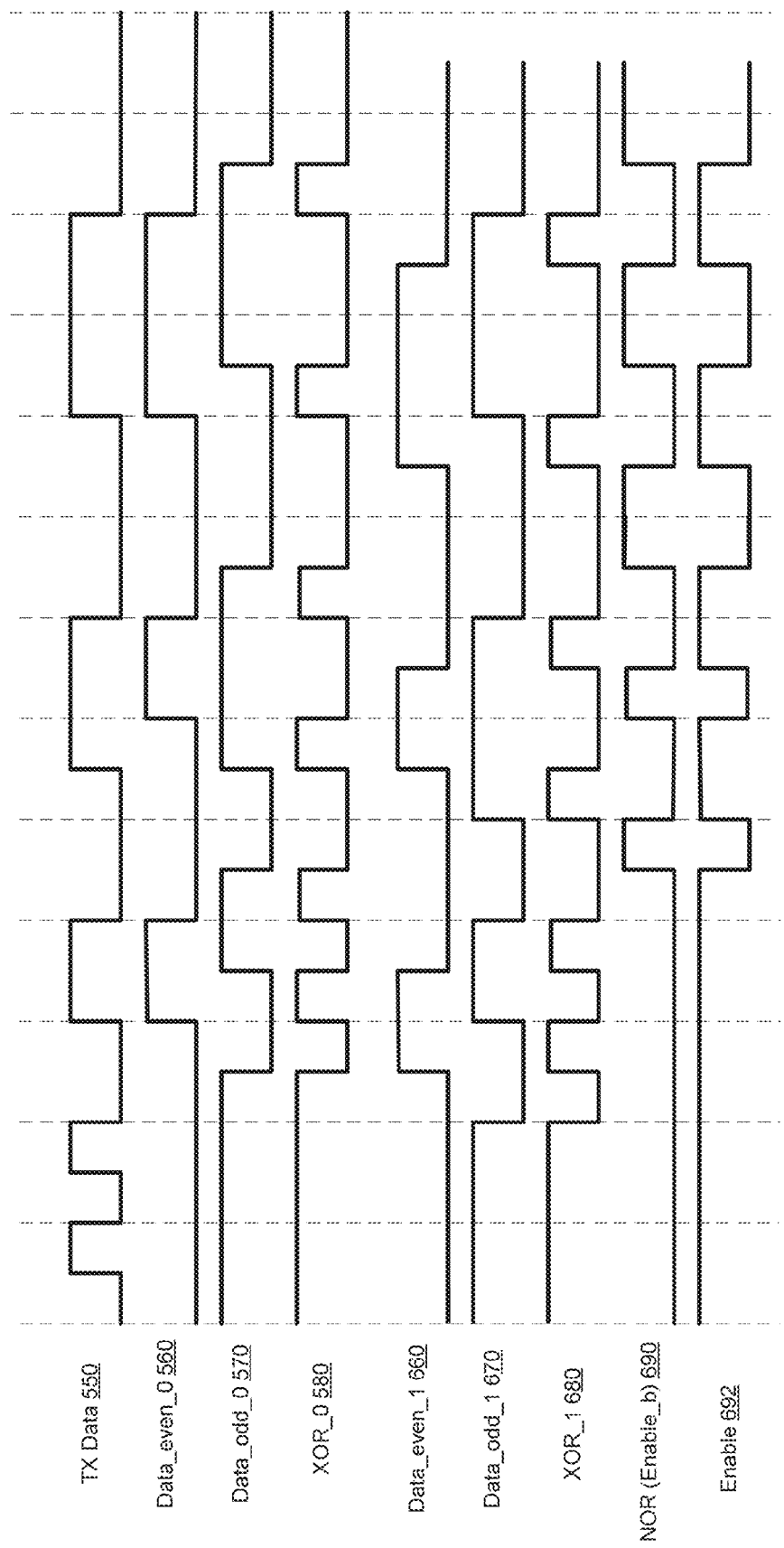
FIG. 6C illustrates another waveform simulation result.

FIG. 6C illustrates a waveform simulation result generating by applying the pattern detection logic 600 on the examplary data sequence 550. The XOR gate 610 works in the same way as XOR gate 510. The even and odd data sequences 660 and 670 may be considered advanced versions by one period compared to the even and odd data sequences 560 and 570 respectively. By performing an XOR operation on the data sequences 660 and 670, a waveform 680, denoted as XOR1 680, may be generated. Further, a NOR operation is performed on the waveforms 580 and 680 to generate a waveform 690, denoted as NOR (Enable_b) 690. Moreover, the waveform 690 may be inverted to become a waveform 692, which may be an output signal of a pattern detection circuit. Depending on the implementation, either the waveform 690 or the waveform 692 may be used as an output signal to control the dynamic output slices. As shown in FIG. 6C, when three CIDs (1's or 0's) appear, the output signal 692 may be a disabling signal for one period, which turns off at least part of the dynamic output slices (e.g., slices 120) for one period. When four CIDs appear, the output signal may be a disabling signal for two periods, which turns off at least part of the dynamic output slices for two periods. Generally, when P CIDs appear (P greater than two), the output signal may be a disabling signal for P−2 periods, which turns off at least part of the dynamic output slices for P−2 periods.

Figure 7:
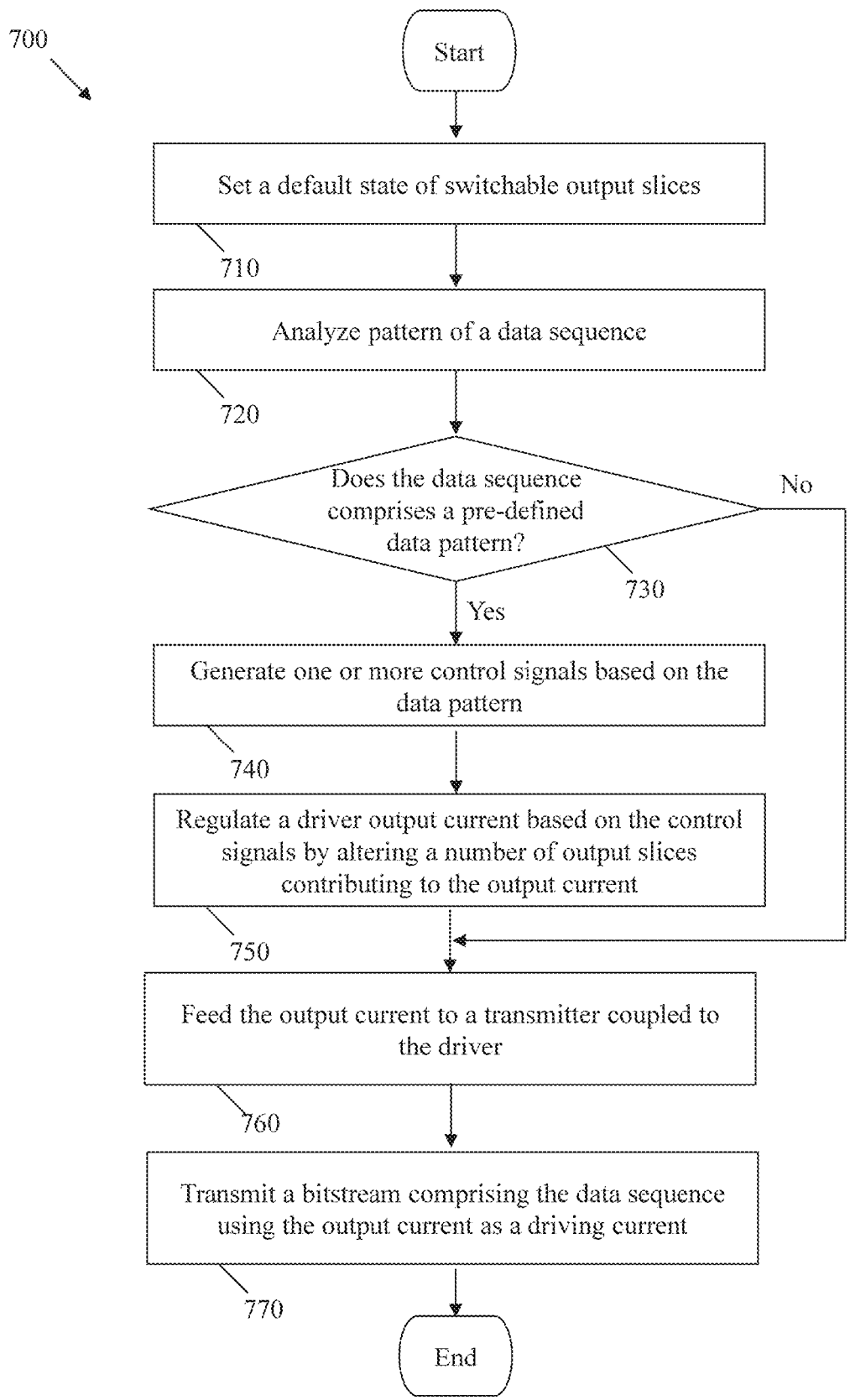
FIG. 7 illustrates an embodiment of a regulation method.

FIG. 7 illustrates an embodiment of a regulation method 700, which may be implemented by a transmission device (e.g., the transmission device 100) comprising a driver and a transmitter. The method 700 may start in step 710, in which a default state of switchable or dynamic output slices in the driver may be set. Depending on the implementation, all slices may be set by default to be switched on, switched off, or with part of the slices on and others off. The step 710 may be skipped in some instances, e.g., if the default state has already been pre-set before use. In step 720, a data sequence may be analyzed by a pattern detection circuit (e.g., the pattern detection circuit 122) in terms of its data pattern. In step 730, the method 700 may determine whether the data sequence comprises a pre-defined data pattern. If the condition in step 730 is met, the method 700 may proceed to step 740. Otherwise, the method 700 may proceed to step 760.

In step 740, one or more control signals may be generated based on the data pattern. Specifically, if the data pattern exists, a control signal may be a disabling signal. In step 750, the method 700 may regulate an output current of the driver based on the control signal(s) by altering a number of output slices contributing to the output current, that is, a number of on slices. Thus, current regulation is based on the pre-defined data pattern. In an embodiment, if all output slices have been set to be on by default, altering the number of output slice comprises turning off at least one of the output slices. In step 760, the output current may be fed into the transmitter coupled to the driver. In step 770, a bitstream comprising the data sequence may be transmitted from the transmission device to a receiving device.

Figure 8A:
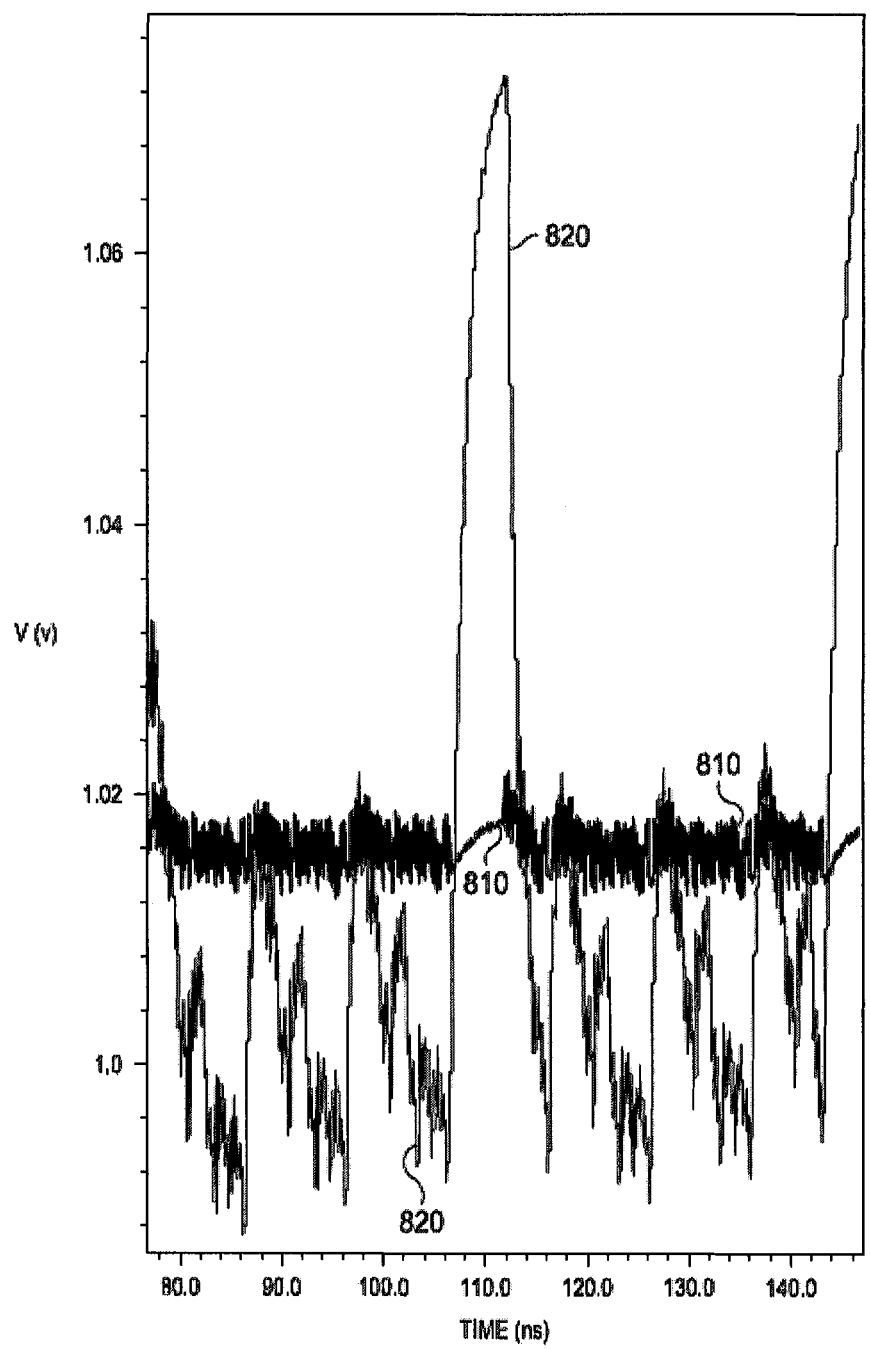
FIGS. 8A-8C show simulation results comparing a disclosed driver to a conventional driver.
Figure 8B:
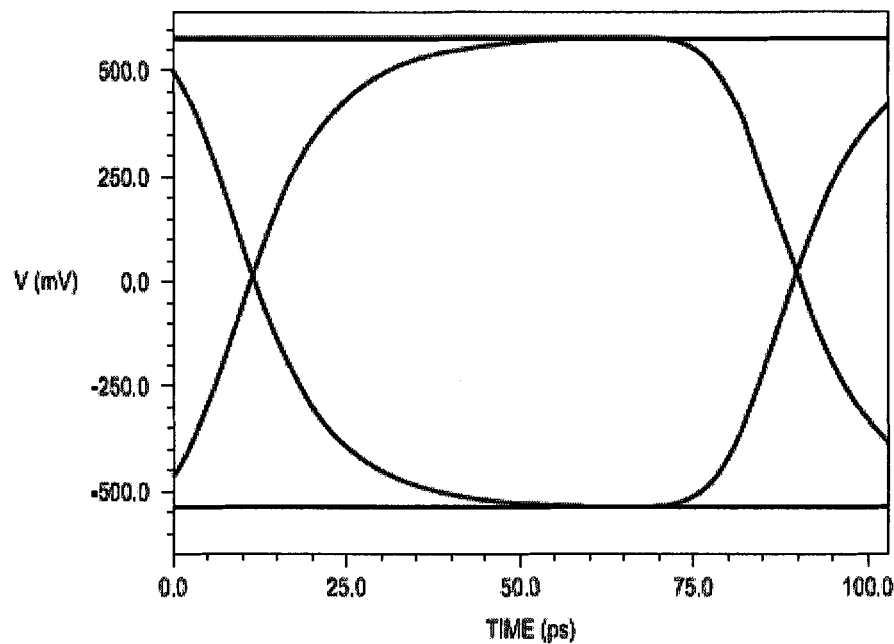
Figure 8C:
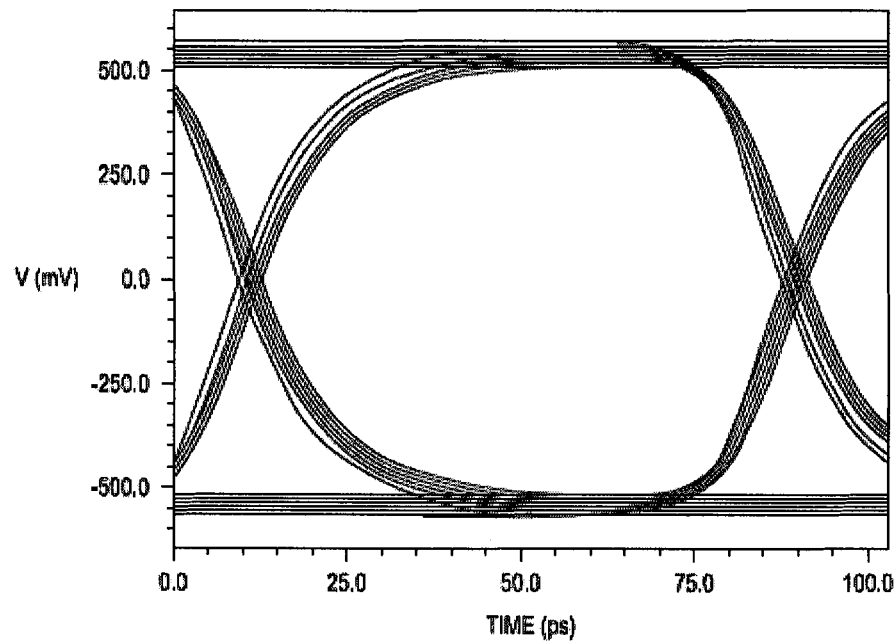

FIGS. 8A-8C show simulation results comparing a disclosed driver, which had a pattern detection circuit, to a conventional driver, which did not have any pattern detection circuit. FIG. 8A shows a regulated voltage curve 810 generated by the disclosed driver and another regulated voltage curve 820 generated by the conventional driver. As shown in FIG. 8A, the disclosed driver was able to reduce self-generated noise in the regulated voltage by a factor of about 9. FIG. 8B shows an examplary waveform at 12.8 Gbps seen at the output of a transmitter coupled to the disclosed driver, while FIG. 8C shows an examplary waveform seen at the output of a transmitter coupled to the conventional driver. Comparing FIG. 8B to 8C, it can be seen that a time jitter using a disclosed configuration was reduced by more than about 6 times. Specifically, when the conventional driver with an NMOS regulator was used, the transmitter output jitter was about 1.8 picoseconds (ps). When the disclosed driver was used, the transmitter output jitter was reduced to about 290 femtoseconds (fs). Thus, the simulation results suggest that the disclosed driver regulation methods and circuits improve performance of data transmission devices.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a pattern detection circuit configured to determine whether a data sequence comprises a pre-defined data pattern; and
    an output slice operably coupled to the pattern detection circuit, wherein the output slice is configured to:
        regulate an output current based on the pre-defined data pattern; and
        feed the output current to a transmitter able to receive the output current independently of the data sequence and transmit a bitstream comprising the data sequence.

2. The apparatus of claim 1, wherein the pattern detection circuit and the output slice form a voltage-mode driver, and wherein regulating the output current is for stabilizing an output voltage supplied to the transmitter.

3. The apparatus of claim 1, wherein the pre-defined data pattern is a sequence of consecutive identical digits (CIDs), and wherein a number of digits in the sequence of CIDs equals or exceeds a threshold.

4. The apparatus of claim 3, wherein the pattern detection circuit is operably coupled to a plurality of output slices that are switchable between an on state and an off state, wherein each output slice contributes to the output current when switched on, and wherein regulating the output current comprises altering a number of output slices contributing to the output current.

5. The apparatus of claim 3, wherein the pattern detection circuit is further configured to:
    receive an input signal; and
    continue regulating the output current only when the input signal is negative.

6. The apparatus of claim 4, wherein all of the output slices are turned on by default, and wherein altering the number of output slices comprises turning off at least one of the output slices if the data pattern exists in the data sequence.

7. The apparatus of claim 4, wherein all of the output slices are turned off by default, and wherein altering the number of output slices comprises turning on at least one of the output slices if the data pattern does not exist in the data sequence.

8. The apparatus of claim 4, wherein the plurality of output slices comprise a number of groups and are controllable by k signals, and wherein k is an integer denoting the number of groups.

9. The apparatus of claim 4, wherein each of the output slices comprises two metal oxide semiconductor field-effect transistors (MOSFETs).

10. The apparatus of claim 4, wherein the data sequence is represented by an even data sequence and an odd data sequence, wherein determining whether the data sequence comprises the pre-defined data pattern comprises performing an exclusive or (XOR) logic operation on the even and odd data sequences to generate a control signal, and wherein regulating the output current is determined by the control signal.

11. The apparatus of claim 6, wherein the at least one of the output slices remains in the off state for a time period dependent on the number of digits in the sequence of CIDs.

12. The apparatus of claim 8, wherein the number of the output slices equals $2^k-1$, wherein the threshold is no greater than three.

13. The apparatus of claim 10, wherein the control signal is a first signal, wherein determining whether the data sequence comprises the pre-defined data pattern further comprises:
performing the XOR logic operation on a delayed version of the even and odd data sequences to generate a second signal; and
performing a negated or (NOR) logic operation on the first and second signals to generate a third signal, and
wherein regulating the output current is determined by the third signal.

14. A method comprising:
determining, by a pattern detection circuit, whether a data sequence comprises a pre-defined data pattern;
regulating, by an out an output current of a circuit based on the pre-defined data pattern; and
transmitting, by a transmitter, a bitstream comprising the data sequence using the output current as a driving current,
wherein the output current is received by the transmitter independently of the data sequence.

15. The method of claim 14, wherein the pre-defined data pattern is a sequence of consecutive identical digits (CIDs), and wherein a number of digits in the sequence of CIDs equals or exceeds a threshold.

16. The method of claim 15, wherein the circuit comprises a plurality of the output slices that are switchable between an on state and an off state, wherein each of the output slices contributes to the output current when switched on, and wherein regulating the output current comprises altering a number of output slices contributing to the output current.

17. The method of claim 16, wherein altering the number of output slices comprises turning off at least one of the output slices if the data pattern exists in the data sequence.

18. The method of claim 16, wherein the data sequence is represented by an even data sequence and an odd data sequence, wherein determining whether the data sequence comprises the pre-defined data pattern comprises performing an exclusive or (XOR) logic operation on the even and odd data sequences to generate a control signal, and wherein regulating the output current is based by the control signal.

19. An apparatus for data transmission comprising:
a transmitter configured to receive an output current independently of a number of consecutive identical digits (CIDs) and to transmit a bitstream comprising the number of CIDs; and
a driver coupled to the transmitter and configured to:
regulate an output current based on the CIDs to stabilize an output voltage; and
feed the output current and the output voltage to the transmitter.

20. The apparatus of claim 19, wherein the driver comprises:
a plurality of dynamic output slices, wherein each of the dynamic output slices is switchable between an on state and an off state and contributes to the output current when switched on; and
a pattern detection circuit configured to:
detect the CIDs; and
generate one or more disabling signals if the CIDs exist,
wherein regulating the output current comprises turning off at least a portion of the dynamic output slices using the one or more disabling signals.

* * * * *